US007168547B2

(12) United States Patent
Thaler et al.

(10) Patent No.: US 7,168,547 B2
(45) Date of Patent: Jan. 30, 2007

(54) PASSENGER CONVEYOR DRIVE MACHINE

(75) Inventors: Dietmar Thaler, Seggebruch (DE); Richard Fargo, Plainville, CT (US); Helmut J. W. Meyer, Bueckeburg (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/544,863

(22) PCT Filed: Feb. 7, 2003

(86) PCT No.: PCT/EP03/01255

§ 371 (c)(1),
(2), (4) Date: Aug. 5, 2005

(87) PCT Pub. No.: WO2004/069721

PCT Pub. Date: Aug. 19, 2004

(65) Prior Publication Data

US 2006/0144672 A1 Jul. 6, 2006

(51) Int. Cl.

| | |
|---|---|
| ***B66B 23/02*** | (2006.01) |
| ***B66B 25/00*** | (2006.01) |
| ***B66B 21/00*** | (2006.01) |
| ***B66B 21/02*** | (2006.01) |
| ***B65G 15/00*** | (2006.01) |
| ***B65G 17/00*** | (2006.01) |
| ***B65G 43/00*** | (2006.01) |

(52) U.S. Cl. ....................... 198/330; 198/322; 198/326

(58) Field of Classification Search ................ 198/326, 198/322, 327, 330, 329

See application file for complete search history.

(56) References Cited

U.S. PATENT DOCUMENTS

| | | | | |
|---|---|---|---|---|
| 4,499,986 | A * | 2/1985 | Tsuboi et al. | 198/322 |
| 4,535,880 | A * | 8/1985 | Boltrek | 198/330 |
| 5,224,580 | A * | 7/1993 | Nurnberg et al. | 198/330 |
| 5,944,164 | A * | 8/1999 | Behle | 198/333 |
| 6,155,401 | A | 12/2000 | Lunardi et al. | |
| 6,161,674 | A | 12/2000 | Jokela et al. | |
| 6,273,235 | B1 * | 8/2001 | Inoue | 198/330 |
| 6,427,823 | B1 * | 8/2002 | Ishikawa et al. | 198/330 |
| 6,640,957 | B2 * | 11/2003 | Fargo et al. | 198/321 |
| 6,640,959 | B1 * | 11/2003 | Haumann et al. | 198/331 |
| 6,702,094 | B2 * | 3/2004 | Ishikawa et al. | 198/330 |
| 2002/0104735 | A1 | 8/2002 | Meyer et al. | |

FOREIGN PATENT DOCUMENTS

| | | | |
|---|---|---|---|
| DE | 3232580 | A | 3/1984 |
| EP | 0936175 | A | 8/1999 |
| JP | 08198561 6 | A | 8/1996 |
| JP | 2001 341966 | A | 12/2001 |

OTHER PUBLICATIONS

PCT International Search Report for PCT/EP03/01255, dated Oct. 28, 2003.

International Preliminary Examination Report for PCT/EP03/01255, dated Apr. 26, 2005.

* cited by examiner

*Primary Examiner*—Gene O. Crawford
*Assistant Examiner*—Ramya G. Prakasam

(57) ABSTRACT

Passenger conveyor (2) including an endless conveyor band (6) connected to a drive chain (8) at each lateral edge thereof and driven by a conveyor band drive (40) including an electric motor (48) and one drive output device (42) at each lateral edge of the conveyor band (6) for driving the respective drive chain (8), characterised in that the conveyor band drive (40) is arranged laterally outside of the conveyor band (6).

11 Claims, 3 Drawing Sheets

PASSENGER CONVEYOR DRIVE MACHINE

FIELD OF THE INVENTION

The present invention relates to passenger conveyor, like escalators and moving walkways, having an endless conveyor band.

DESCRIPTION OF THE RELATED ART

Passenger conveyors of this kind are known for example from U.S. Pat. No. 4,775,044. Particularly, this document discloses a passenger conveyor drive located within the region of reversal and inside the rotating step or pallet belt. This type of passenger conveyor requires a maintainance room in the region of reversal which is space consuming and therefor not desired. The total length of the conveyor, i.e. the distance between end supports is decisive for architects and building owners when deciding on the conveyor. Therefore, it has also been suggested to mount this type of conveyor drive remote from the region of reversal between the advance part and the return path of the conveyor band. This, however, requires a distance between the advance path and the return path sufficiently for housing the drive components and particularly the electric motor therein. Moreover maintainability of such type of conveyor drive is poor as access to the components thereof requires the disassembly of one or more steps or pallets. Such disassembly is a difficult and labour—consuming task and frequently results in destruction of such step or pallet.

On the other hand, also the lateral space for a passenger conveyor is limited. As space consumption is generally of concern and due to the fact that architects and building owners decide by and large on the basis of space consumption, most of the passenger conveyors in the market have substantially the same width as compared to the width of the step or pallet belt. Practically, a today's escalator having a step belt width of 1000 mm has a complete width of 1500 mm which is hardly enough for housing the drive chain, the step axle rollers, the chain rollers and the respective guide tracks.

SUMMARY OF THE INVENTION

Exemplary embodiments of the invention include a passenger conveyor having compact overall dimensions and a reduced length and/or distance between advance and return paths of the conveyor band.

Exemplary embodiments of the invention include a passenger conveyor of having the conveyor band drive arranged laterally outside of the conveyor band.

This design allows for a substantially reduced distance between the advance path and the return path of the conveyor band which is particularly advantageous with glass escalators as well as escalators which are to be placed in a building in a way so as to allow the aspect from one side thereof. This design results in a very slim appearance as the aspect ratio, i.e. the proportion between length and height of the inclined portion of the escalator, is relatively large as compared to escalators having the conveyor drive located between the advance and return paths thereof.

The drive output may be of different construction. It can be a chain sprocket, etc., but preferably is a belt drive comprising an endless drive belt which is moving around a driven wheel and an idler wheel. The belt drive is preferred for several reasons, like improved ride quality, reduced noise generation, etc.

The passenger conveyor preferably is of the type having a "moving" lateral flange, i.e. a flange which is moving together with the the steps and pallets, respectively, as described for example in WO 02/44072 A1. With this type of escalator/moving walk, it is easily possible to have the step guidance roller track above the chain in the advance path and below the chain in the return path of the conveyor band so that the space between the advance and the return path of the chain is substantially empty. It is possible to locate the conveyor drive substantially within this space. Needless to say that such location for the conveyor drive is preferred also in cases where the conveyor is not of the moving flange type. It is generally possible to have parts of the drive extending in the space between the advance path and the return path of the conveyor band, in a way so that they generally do not require increase in distance between advance and return paths of the conveyer band.

The conveyor drive is preferably of a modular construction, providing the drive force for a particular rise distance or transportation distance. Thus it is easily possible to construct conveyors having a larger rise or transportation distance, by implementing the required number of drives for the respective application. By using this modular drive principle, it is possible to substantially reduce manufacturing costs, as only one specific drive module suffices for realising conveyors of different rise and transportation distance. Moreover, as the construction is generally designed for a plurality of drive modules anyhow, it is possible to use even with relatively small conveyors a plurality of drive modules so that each individual drive module can be of smaller construction.

The electric motor preferably is of the "cylindrical" type, i.e. having a length along its longitudinal axis which is longer than, and preferably at least twice as long as, the diameter thereof.

Preferably, the conveyor drive includes a gearbox connected between the electric motor and the drive output devices. The gearbox serves for reducing the rotational speed of the electric motor to a speed required for driving the output devices. The gearbox input may be directly connected with the motor's output. Alternatively, a coupling for accommodating slight deviations between motor output and gearbox input can be provided there between.

Preferably, the output devices are connected via a synchronising shaft. Depending on the type of output device, the sprocket or the drive wheel are preferably coupled to each other by the synchronising shaft in order to ensure concomitant rotation thereof.

Preferably, the motor includes a flywheel and/or a brake. Flywheel and/or brake are connected to the motor output for rotation therewith for forming a highly compact unit. The combination thereof into the motor reduces the overall dimensions of the conveyor drive.

Preferably, the motor axis is arranged generally parallel to the running direction of the drive chain, i.e. rotated by generally 90° relative to the rotational axis of the sprocket or drive wheel. Such arrangement of the motor allows for the motor to be located substantially between the advance and the return paths of the drive chain. With such a construction, the gearbox includes at least a gearing stage including a hypoid or a bevel gearing for turning the rotational axis by 90°. It is particularly preferred if the gearbox includes two reduction stages, i.e. a hypoid or bevel first stage gearing and a spur toothed or helical second stage gearing.

Preferably, the motor is attached and supported by the gearbox housing. With such a construction, it is possible to substantially combine the motor and the gearbox to a unit.

This unit can easily be attached to the truss of the conveyor and can easily be handled during assembly of the conveyor drive. Moreover, such compact construction can serve for reducing the required space.

Preferably, the motor is attached to and supported by a motor frame which is attached to and preferably supported by the gearbox housing. This construction allows for easy mounting of a motor including flywheel and/or brake as separate parts to the gearbox. It further allows for relatively easy replacement of motor which typically is the part which needs to be replaced most. It is preferred to have a coupling for accommodating directional deviations between motor output and gearbox input particularly with this type of construction in order to reduce alignment requirements in case of motor replacement.

Preferably, the conveyor drive includes a torque support member attached between the output devices on the opposing edges of the conveyor drive. Such torque member is suitable for reducing the torque to be transferred by the conveyor truss to which the conveyor drive is connected. By directly connecting the two conveyor drives with each other the construction becomes much stiffer and the amount of relative displacement between the drive outputs is greatly reduced.

Preferably, the passenger conveyor includes two electric motors one thereof preferably being at each edge of the conveyor band. Most preferred each motor is connected via a gearbox to the respective output device on each side. This construction is preferred as the motor and the gearbox can each be smaller as compared with a construction having a single motor and gearbox of similar power output.

Preferably, the conveyor band drive includes a drive frame on each side of the conveyor band. The drive chain roller guide tracks can be mounted to the drive frames. The drive frames allow for a unitary construction of the drive which allows the assembly and alignment of the complete drive before mounting it to the truss of the conveyor.

BRIEF DESCRIPTION OF THE DRAWING

The invention and embodiments of the invention are described in greater detail below with reference to the figures, wherein.

DETAILED DESCRIPTION

Figure 1:
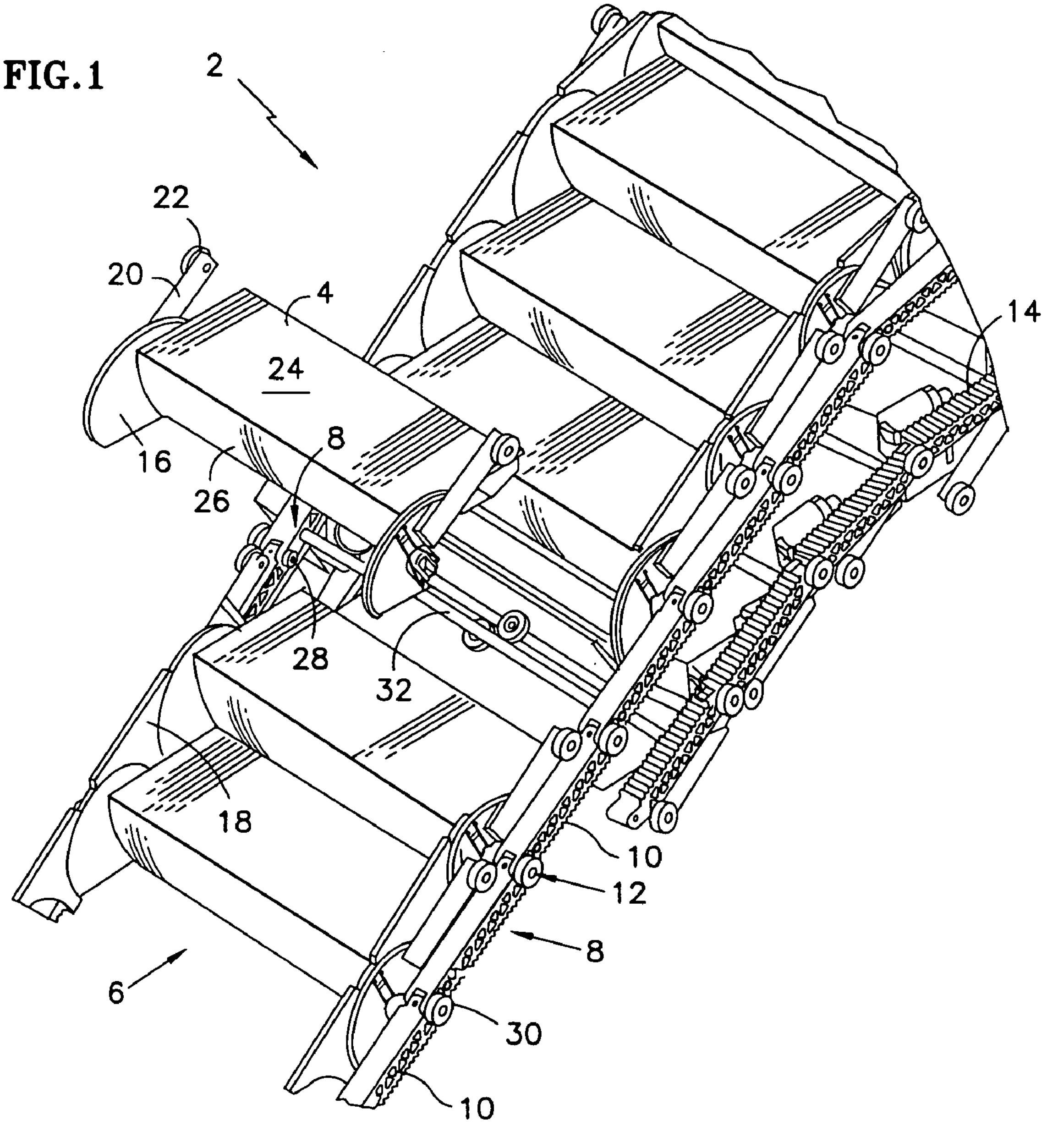
FIG. 1 shows a portion of a passenger conveyor suitable for embodying the present invention.
Figure 2:
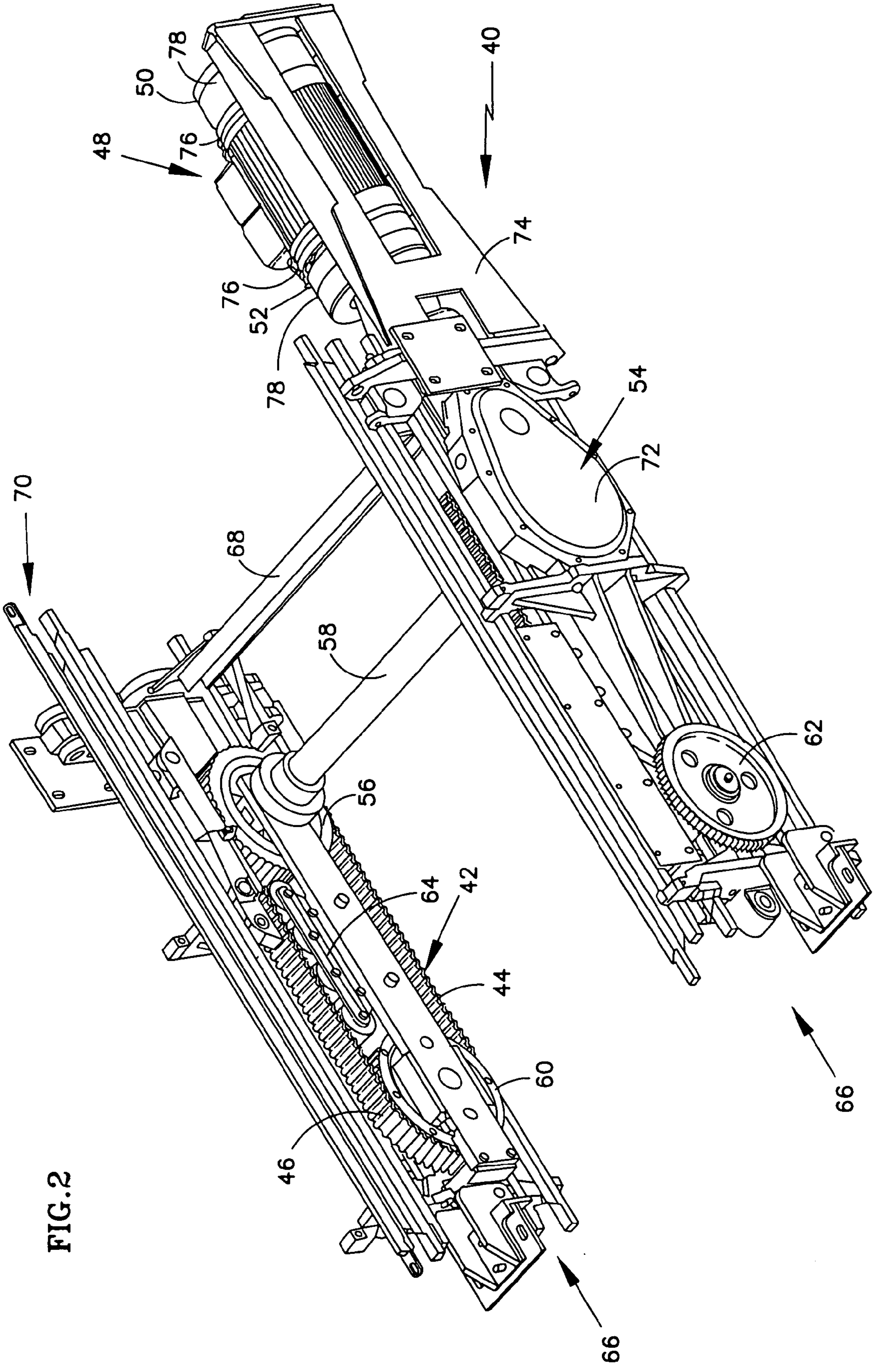
FIG. 2 shows a conveyor drive according to the present invention.
Figure 3:
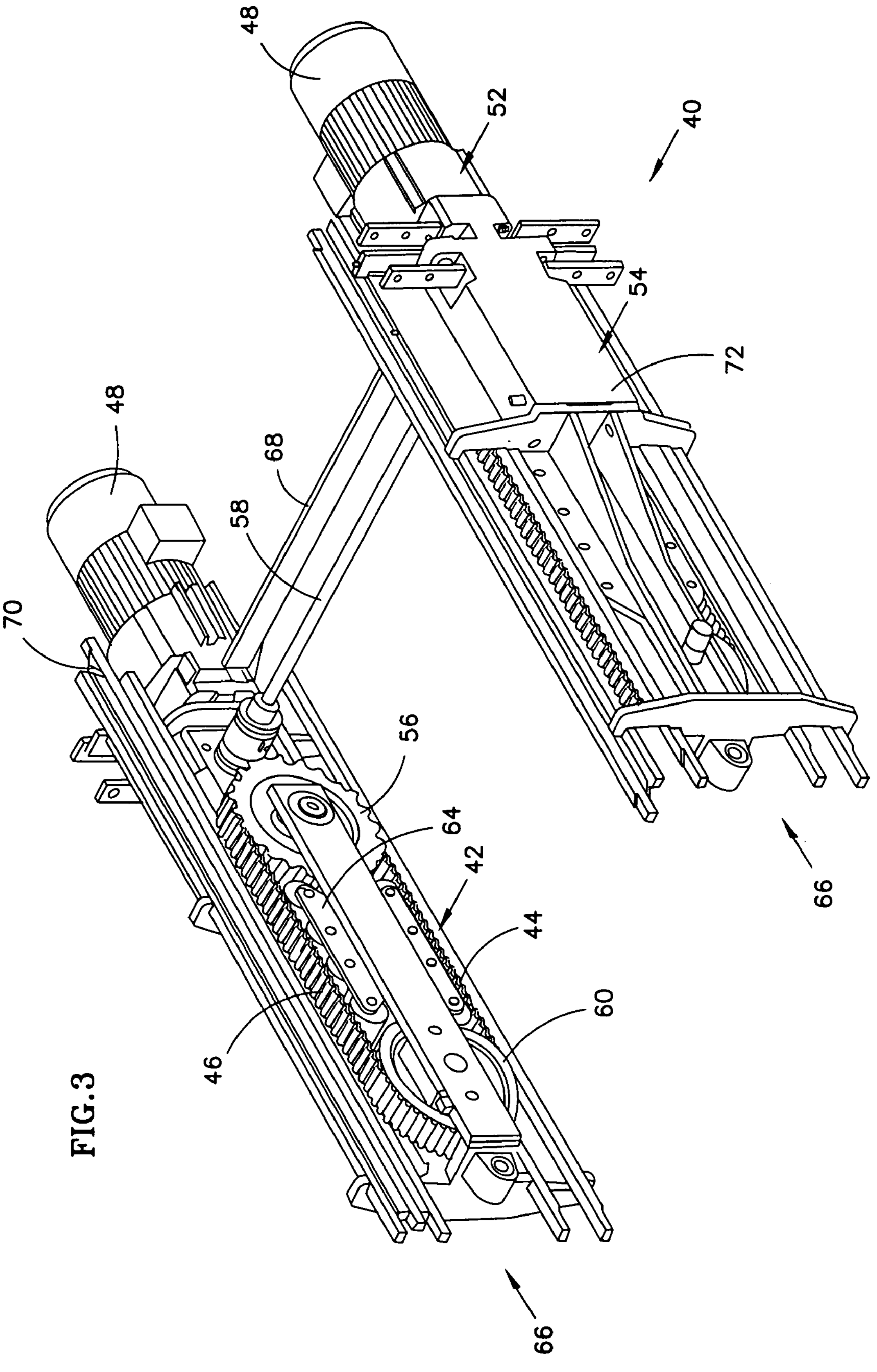
FIG. 3 shows an alternative embodiment of the conveyor drive of the present invention.

FIG. 1 shows a passenger conveyor 2 with an endless passenger conveyor band 6 that is composed of several interconnected footboard elements 4. The footboard elements 4 are connected to drive chains 8 that are respectively arranged laterally of the footboard elements and consist of a series of chain links 10. The chain links 10 are connected to one another at pivots 12. The passenger conveyor 2 is driven by a linear drive 40 as shown in FIGS. 2 and 3, respectively. This linear drive 40 has a drive output 42 of the type that contains an endless revolving drive belt 44 having a toothing 46. The toothing 46 of the drive belt 44 matches with a toothing 14 of the chain links 10.

In FIG. 1 the shown passenger conveyor 2 consists of an escalator. In escalators, the passenger conveyor band 6 is referred to as a stair or step belt, and the footboard elements 4 are referred to as steps. FIG. 1 mainly shows the step band 6, the drive chain 8 and chain and step rollers 30 and 22, respectively. Thus, roller guide tracks, etc. are not shown in FIG. 1. One of the steps 4 is removed from the passenger conveyor belt 6. The step 4 contains a lateral flange element 16 that moves together with the step 4. The flange elements 16 are rigidly fastened on step 4, wherein a second type of flange element 18 is respectively arranged between two flange elements 16. Flange element 16 is commonly referred to as "flange" while the second type of flange element 18 is commonly referred to as "bridge". The bridges 18 bridge the interstices between two consecutive flanges 16 and are typically connected with the drive chain 14. A cover (not shown) follows the ballustrade towards the top from the flanges 16 and bridges 18 of the steps 4.

The steps 4 are moved in a revolving fashion by the drive chains 8. Step rollers 22 arranged on arms 20 serve for controlling the position of the stepping surface 24 of the step 4. The step roller 22 is guided in a guide way or guide track (not shown). The guide track follows a predetermined curve for the step wheel 22 such that the position of each footboard element 4 is defined in a compulsory fashion. As mentioned above, one step 4 contains the stepping surface 24 and a step front side 26 that is also referred to as the "riser".

The individual chain links 10 of the drive chains 8 are connected at the pivots 12 by means of short axial bolts 28. Chain wheels 30 are rotatably arranged on the outside of the axial bolts 28.

Two chain links 10 of the left and the right step chains 8 which are identically arranged relative to the step 4 are rigidly connected to one another by means of a connecting axle 32. The connecting axle 32 does not protrude outward beyond the chain links 10. Each step 4 has a lateral holding device by means of which it Is connected to the drive chain 8. Regarding the particular construction, reference is made to WO 02/44072 A1. With such construction it is relatively easy to disassemble steps 4 from the step belt 6 even at locations remote from the region of reversal at the upper end lower landings, resp.

It is to be noted that while the present invention is being described herein with respect to an escalator, it is also applicable in a moving walkway.

Referring to FIG. 2, the conveyor band drive 40 includes an electric motor 48 of substantially cylindrical shape. The motor 48 comprises fly wheels 50 and 52 at each ends thereof. One of the fly wheels 50, 52 further includes a brake (not shown) the motor 48 is connected by way of an alignment coupling to the input of a gear box 54. The output of the gear box 54 drives two output devices 42 one each side of the conveyor band 6. As already mentioned the toothing 46 of the drive belt 44 matches with the toothing 14 of the drive chain 8.

Particularly, the gear box drives the drive wheels 56 of the drive output devices 42 which are connected with each other via a sychronizing shaft 58. Idler rollers 60 tension the drive belt 46. Handrail drive wheels 62 are connected with the idler rollers 60 for transmitting a drive force to the handrails (not shown) e.g. by way of a drive belt (not shown).

A set of backing rollers 64 which are arranged beneath the drive belt 44 between the drive wheel 56 and the idler roller 60 secure correct engagement of the toothings 46 and 14 along the complete engagement length of the drive belt 44. Each output device 42 is supported by a drive frame 66. The drive frame 66 on the one hand supports the respective components of the conveyor drive 40 and further serves for mounting the conveyor drive 40 to the escalator truss. The two drive frames 66 are interconnected by means of a torque support member 68. The torque support member 68 serves for avoiding relative rotation of the two drive outputs 42 relative to each other in use. It further serves as a structural member for securing the integrity of the conveyor drive 40 in advance and during assembly thereof in the escalator truss.

Also attached to the drive frames 66 are step chain roller guide tracks 70. One may notice that such step chain roller guides tracks 70 are positioned outside of the drive belt 44 with respect to the central conveyor band 6.

The gear box 54 is of a very flat construction. The gear box housing 72 serves as a structural part of the guide frame 66 and supports a motor frame 74. The gear box 54 preferably is of a two stage construction. It further has a sealed housing 72 containing a lubricant. The gear box and lubrication are preferably designed for the complete lifetime of the escalator. The gear box provides a speed reduction from the typical speed of the electromotor of approximately 1000 to 2000 rpm to the required speed of the drive wheel of between 10 and 100 rpm so that the speed reduction of the gear box 54 is within the range of 80:1 to 10:1.

The motor 48 is secured to the motor frame 74 which is attached and supported by the gear box housing 72. According to this embodiment, the motor 48 is secured to the motor frame 74 by way of strap retainers 76. The strap retainers 76 allow for easy dismounting of the motor 48 from the conveyor band drive 40 after disengaging of the alignment coupling. Particularly, in order to simplify the dismounting of the motor 48 grooves 78 are provided in the fly wheels 50, 52. A disassembly truss (not shown) can be attached to the escalator truss or to the motor frame 74 so that guide rails of the disassembly truss cooperate with the grooves 78. After dismounting the strap retainers 76 and the alignment coupling, the motor 48 can easily be rolled out of its mounting position. Vice versa the motor 48 can easily be mounted in the conveyor band drive 40. In combination with the particular escalator type as shown in FIG. 1 which allows for easy disassembly for the steps 4, the conveyor of the present invention is simple to maintain from the conveyor band 6 and requires no separate machine or maintenance room.

It is to be noted that a second gear box 54 and motor 48 can easily be provided on the other side of the conveyor band 6 as well. FIG. 3 also shows a conveyor band drive 40 which is relatively similar to the conveyor band drive of FIG. 2. Identical reference numerals in the drawings refer to similar or identical components. The main difference between the conveyor band drives 40 of FIGS. 2 and 3 is with the electric motor 48. With the construction of FIG. 3, the electric motor 48 which also includes fly wheel 52 and the brake is directly attached to and supported by the housing 72 of the gear box 54. Thus, the disassembly of the motor 48 of the conveyor band drive 40 according to FIG. 3 is somewhat more complicated than with the construction of FIG. 2.

With respect to FIGS. 2 and 3 one may easily see the modular construction of the conveyor band drives 40. Generally, the complete drive 40 is positioned between the upper and lower run of the drive chain 8 plus the distance as required by the drive chain roller 30 and the drive chain roller guidance track 70 with only interconnecting parts like the synchronising shaft and the torque support cross member 58, 68, respectively, and possibly smaller portions of the motor 48 and the gear box 54 extending somewhat under the conveyor band 6.

With a typical drive, the motor size can be between 100 and 160 mm, the gear box has a tapering thickness of approximately 120 mm at the input end and toward approximately 90 mm at the output end. The new concept of the invented conveyor band drive 40 allows to greatly reduce the distance between the advance path and return path of the conveyor band 6 without increasing the distance between end supports, without requiring a machine room and without requiring additional space laterally from the conveyor belt as compared with conventional designs. In this respect it has been noted before the conventional designs have an overall width of 1500 mm for conveyors having footboard elements 4 with a width of 1000 mm.

Typical conveyors 2 have the conveyor band 6 running through an endless path beginning at the reversal portion at or below the entry landing, advancing to an essentially horizontal step—on area, further through a transition region into the inclined portion. Subsequent to the inclined portion there is a further transition region bringing the band 6 back to a substantial horizontal step—off area next to the exit landing. The band continues around the exit reversal along the return path to the entry reversal. The conveyor band drive 40 according to the present invention is preferably arranged in the inclined portion.

The invention claimed is:

1. Passenger conveyor comprising:

an endless conveyor band connected to a drive chain at each lateral edge thereof and driven by a conveyor band drive including an electric motor and one drive output device at each lateral edge of the conveyor band for driving the respective drive chain, the drive chain comprises a drive chain roller and is guided along a drive chain roller guide track along an upper and lower run of the drive chain, wherein the conveyor band drive is arranged laterally outside of and adjacent to the conveyor band substantially in the space as defined by the upper and lower run of the drive chain plus the distance as required by a drive chain roller and a drive chain roller guide track.

2. Passenger conveyor according to claim 1, wherein the conveyor drive includes a gearbox connected between the electric motor and the drive output devices and arranged so that the gearbox is located laterally outside of the conveyor band.

3. Passenger conveyor according to claim 1, wherein the output devices are connected via a synchronising shaft.

4. Passenger conveyor according to claim 1, wherein the motor includes a brake and flywheel.

5. Passenger conveyor according to claim 1, wherein a motor axis is arranged generally parallel to the running direction of the drive chain.

6. Passenger conveyor according to claim 1, wherein the motor is attached to and supported by a gearbox housing.

7. Passenger conveyor according to claim 1, wherein the motor is attached to and supported by a motor frame which is attached to a gearbox housing.

8. Passenger conveyor according to claim 1, further comprising a torque support member attached between the output devices.

9. Passenger conveyor according to claim 1, wherein two electric motors arc provided with one thereof being at each lateral edge of the conveyor band.

10. Passenger conveyor according to claim 1, wherein the conveyor band drive includes a drive frame on each side of the conveyor band.

11. Passenger conveyor according to claim 1, wherein only interconnecting parts of the conveyor band drive and smaller portions of the electric motor and a gear box extend a portion under the conveyor band.

* * * * *